United States Patent [19]

Wolf et al.

[11] Patent Number: 4,495,213
[45] Date of Patent: Jan. 22, 1985

[54] WATER-SOLUBLE SWEETENING TABLET

[75] Inventors: Erich Wolf, Overath; Rolf Deininger, Cologne, both of Fed. Rep. of Germany

[73] Assignee: Chimicasa GmbH, Wiesentalstr., Switzerland

[21] Appl. No.: 431,072

[22] Filed: Sep. 30, 1982

[30] Foreign Application Priority Data

Aug. 31, 1982 [EP] European Pat. Off. ........ 82108002.5

[51] Int. Cl.$^3$ .............................................. A23L 1/236
[52] U.S. Cl. ..................................... 426/548; 426/285
[58] Field of Search ................ 426/548, 271, 285, 454

[56] References Cited

U.S. PATENT DOCUMENTS

| Re. 29,682 | 6/1978 | Cella et al. | 426/548 |
|---|---|---|---|
| 4,009,291 | 2/1977 | Mitchell et al. | 426/548 |
| 4,230,687 | 10/1980 | Sair et al. | 426/548 |
| 4,292,336 | 9/1981 | Latymer | 426/548 |
| 4,384,004 | 5/1983 | Cea et al. | 426/548 |

FOREIGN PATENT DOCUMENTS 57-63068  4/1982  Japan ................................. 426/548

OTHER PUBLICATIONS

Hawley, Gessner G., *The Condensed Chemical Dictionary*, 8th ed., Van Nostrand Reinhold Co. ©1971, p. 824.

*Primary Examiner*—Raymond Jones
*Assistant Examiner*—Elizabeth C. Weimar
*Attorney, Agent, or Firm*—Wenderoth, Lind & Ponack

[57] ABSTRACT

A sweetening tablet containing 70 to 95% of APM (L-aspartyl-L-phenylalanine methylester) with a particle size of from 0.01 to 0.4 mm, up to 1% of an auxiliary tabletting agent, and the rest a solubility accelerator which is a jellifier that swells in water and forms insulating layers enveloping the APM granules.

5 Claims, No Drawings

WATER-SOLUBLE SWEETENING TABLET

This invention relates to a water-soluble sweetening tablet compacted by molding, containing APM (L-aspartyl-L-phenylalanine methylester) as a sweetening agent and a fraction of the APM weight of a solubility accelerator.

APM is difficult to dissolve in water. However, since the APM, when used, must go into solution as rapidly as possible, it is desirable that the APM be released from the tablet quickly so it can go into solution as rapidly as possible. This is achieved, in accordance with the present invention, by a composition containing, on a dry weight basis, 70 to 95%, preferably 75 to 80%, APM with a granular size of 0.01 to 0.4 mm, 0 to 1% auxiliary tabletting agent, and the rest comprising a solubility accelerator which, preferably, is a cross-linked jellifier that swells in water, wherein the APM granules are coated with an insulating layer of a dried gelatine of the solubility accelerator.

The insulating layer prevents the individual APM granules, during the tabletting process or in the tablet, from contacting one another and clumping together. Instead, as the tablet dissolves, the APM granules come individually into contact with the solvent because the insulating layers are very rapidly disintegrated in the water and the APM particles are then dispersed in the water as fine, and therefore more easily soluble, particles.

By adding water to a mixture of the APM and solubility accelerator, the latter swells to a jelly-like substance. These jellies coat the APM granules. When drying the mixture, the jelly layers on the individual granules are stabilized and become the insulating layers.

Recommended solubility accelerators include cross-linked NaCMC (sodium carboxymethylcellulose), also known under the tradename Ac-Di-Sol, and/or cross-linked PVP (polyvinyl pyrrolidone), also known under the tradename PLASTONE, and/or a modified starch whose modification enhances its swelling characteristics. An example of the modified starch which, preferably, is used as the solubility accelerator, is NaCMS (sodium starch glycolate). This modified starch is known under the tradename PRIMOJEL.

It is worthy of note that for the sweetening tablets of the present invention, no substances of any kind are needed that contain digestible carbohydrates, which, for example, would have to be taken into account by diabetics, and furthermore, no substances need be added to the sweetening tablets that are digestible and must be ascribed to the Joule balance.

Preferably, the auxiliary tabletting agent serves as a lubricant during the molding of the tablets. Recommended tabletting agents include GPS (glycerin palmitostearte), also known under the tradename PRECIROL, and L-leucine. However, if suitable modern tabletting machines are used, the auxiliary tabletting agent can possibly be dispensed with completely.

The following examples illustrate the invention, without being limited thereto.

EXAMPLE 1

The following components are used:
Sweetening agent, 180 g: 77.89% APM with a granular size of from 0.01 to 0.2 mm;
Solubility accelerator, 50 g: 21.64% cross-linked NaCMC;
Auxiliary tabletting agent, 1 g: 0.47% GPS; and
Distilled water, 275 ml.
The percentages are based on dry weight.

Tabletting: The NaCMC and APM are mixed and the water is added. This mixture is screened through a screen having a mesh size of 1.6 mm and dried in a layer thickness of 1 cm at 70° C. for 5 hours until a residual moisture content of 3% is obtained. The dry substance thus obtained is screened through a screen with a mesh size of 0.3 mm and mixed with the GPS. The flowable powder mixture obtained is compressed into tablets.

Properties of the finished tablets:
Weight of each tablet: 23 mg;
Size of each tablet: round, diameter 3 mm;
Dissolution time in 18° C. water: within 60 seconds;
Color of tablets: white;
Stability of tablets when stored for 90 days at 35° C. and 80% relative humidity: no change.

Each tablet contains 18 mg of sweetening agent, 5 mg of solubility accelerator and 0.1 mg of auxiliary tabletting agent.

The following examples differ from Example 1 only as indicated in the table below:

TABLE

| | Example 2 | Example 3 | Example 4 | Example 5 |
|---|---|---|---|---|
| Charge: | | | | |
| Quantity of sweetening agent | 190 g | 180 g | 180 g | 180 g |
| Particle size of sweetening agent | 0.2 to 0.4 mm | 0.01 to 0.2 mm | 0.05 to 0.1 mm | 0.1 to 0.4 mm |
| Solubility accelerator | NaCMC | NaCMC | PVP | NaCMS |
| Quantity of accelerator | 10 g | 75 g | 50 g | 50 g |
| Aux. tabletting agent | — | GPS | L-leucine | — |
| Quantity of tabletting agent | 0 | 2.5 g | 2.0 g | 0 |
| Quantity of water | 275 ml | 275 ml | 275 ml | 275 ml |
| Properties of each finished tablet: | | | | |
| Weight | 20 mg | 25.5 mg | 23 mg | 23 mg |
| Size | 2 mm φ | 3 mm φ | 3 mm φ | 3 mm φ |
| Dissolution time* | Within 120 sec. | Within 120 sec. | Within 60 sec. | Within 90 sec. |
| Stability* | As Example 1 | As Example 1 | As Example 1 | As Example 1 |
| Color | As Example 1 | As Example 1 | As Example 1 | As Example 1 |
| Quantity of sweetening agent | 19 mg | 18 mg | 18 mg | 18 mg |
| Quantity of accelerator | 1 mg | 7 mg | 5 mg | 5 mg |
| Quantity of tabletting agent | — | 0.3 mg | 0.2 mg | — |

*each under the conditions stated in Example 1

As shown in the examples, if there is too much solubility accelerator, the solubility is deleteriously affected, because the tablet initially swells in the water and becomes too viscous, thus preventing the water from further entering the interior of the tablet. The amount of solubility accelerator according to Example 3 is still acceptable for a tablet to be dissolved in cold water.

When there is too little solubility accelerator, the solubility is impaired, because there is too little insulating material. The tablet is disintegrated initially very rapidly, but only in large hard-to-dissolve clumps. The amount of solubility accelerator in Example 2 is still adequate for a tablet to be dissolved in cold water.

What is claimed is:

1. A compressed water-soluble sweetening tablet containing, on a dry weight basis:
    70 to 95% of L-aspartyl-L-phenylalanine methylester as a sweetening agent, having a granular size of 0.01 to 0.4 mm,
    0 to 1% of an auxiliary tabletting agent, and
    the rest comprising a water-swellable jellifier as a solubility accelerator, selected from the group consisting of cross-linked sodium carboxymethylcellulose and cross-linked polyvinyl pyrrolidone,
    wherein the granules of said sweetening agent are coated with a dried layer of said solubility accelerator.

2. A tablet according to claim 1, wherein the solubility accelerator is cross-linked sodium carboxymethylcellulose.

3. A tablet according to claim 1, wherein the solubility accelerator is cross-linked polyvinyl pyrrolidone.

4. A tablet according to any one of claims 1 to 9 containing, on a dry weight basis:
    75 to 80% of the L-aspartyl-L-phenylalanine methylester.

5. A tablet according to claim 1 containing, on a dry weight basis:
    77.89% of the L-aspartyl-L-phenylalanine methylester,
    21.64% of cross-linked sodium carboxymethylcellulose, and
    0.47% of glycerin palmitostearate as the auxiliary tabletting agent.

* * * * *